Sept. 30, 1969   B. L. MANFRE   3,469,383
VINE CROP HARVESTING MACHINE
Filed Aug. 16, 1966   5 Sheets-Sheet 1
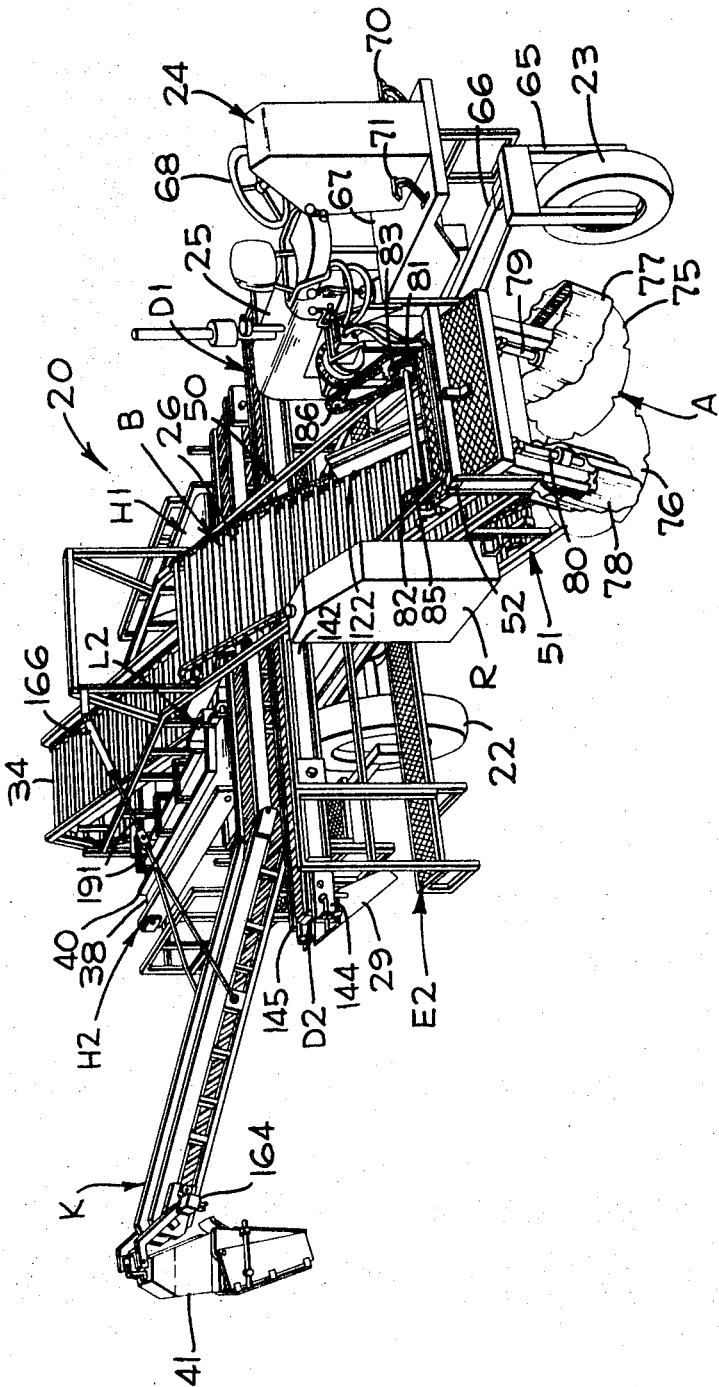
INVENTOR
BEN L. MANFRE
BY Francis W. Anderson
ATTORNEY

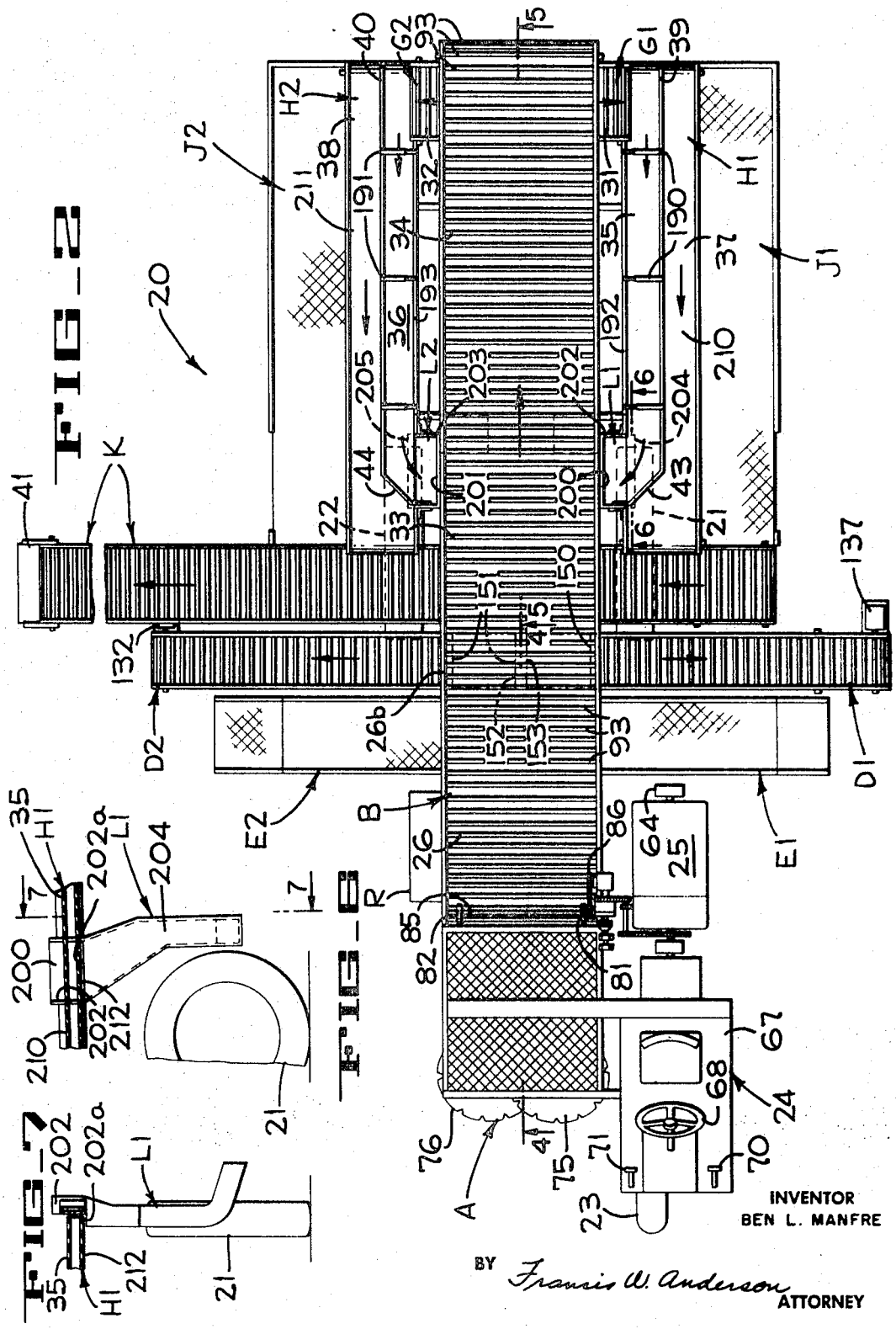

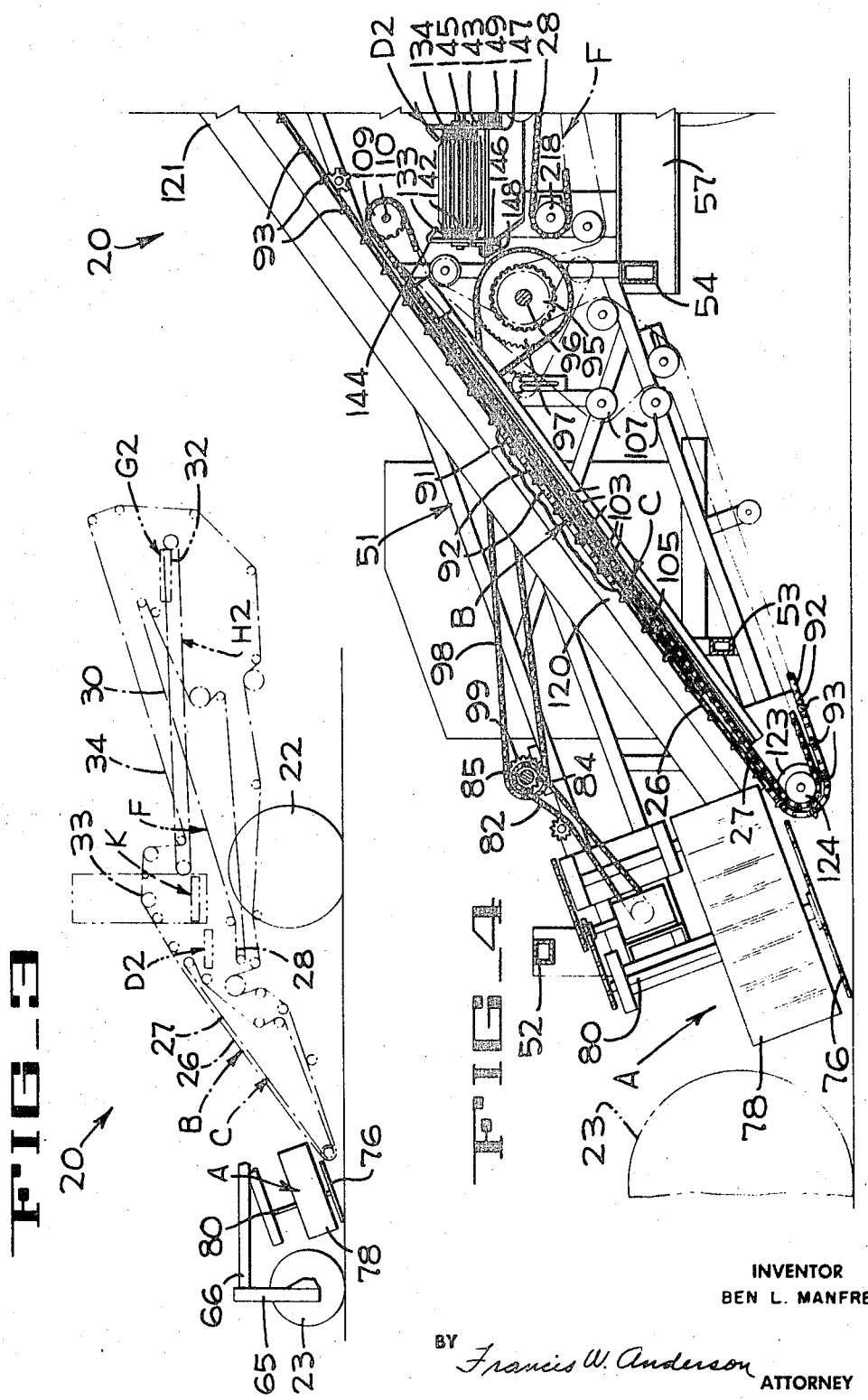

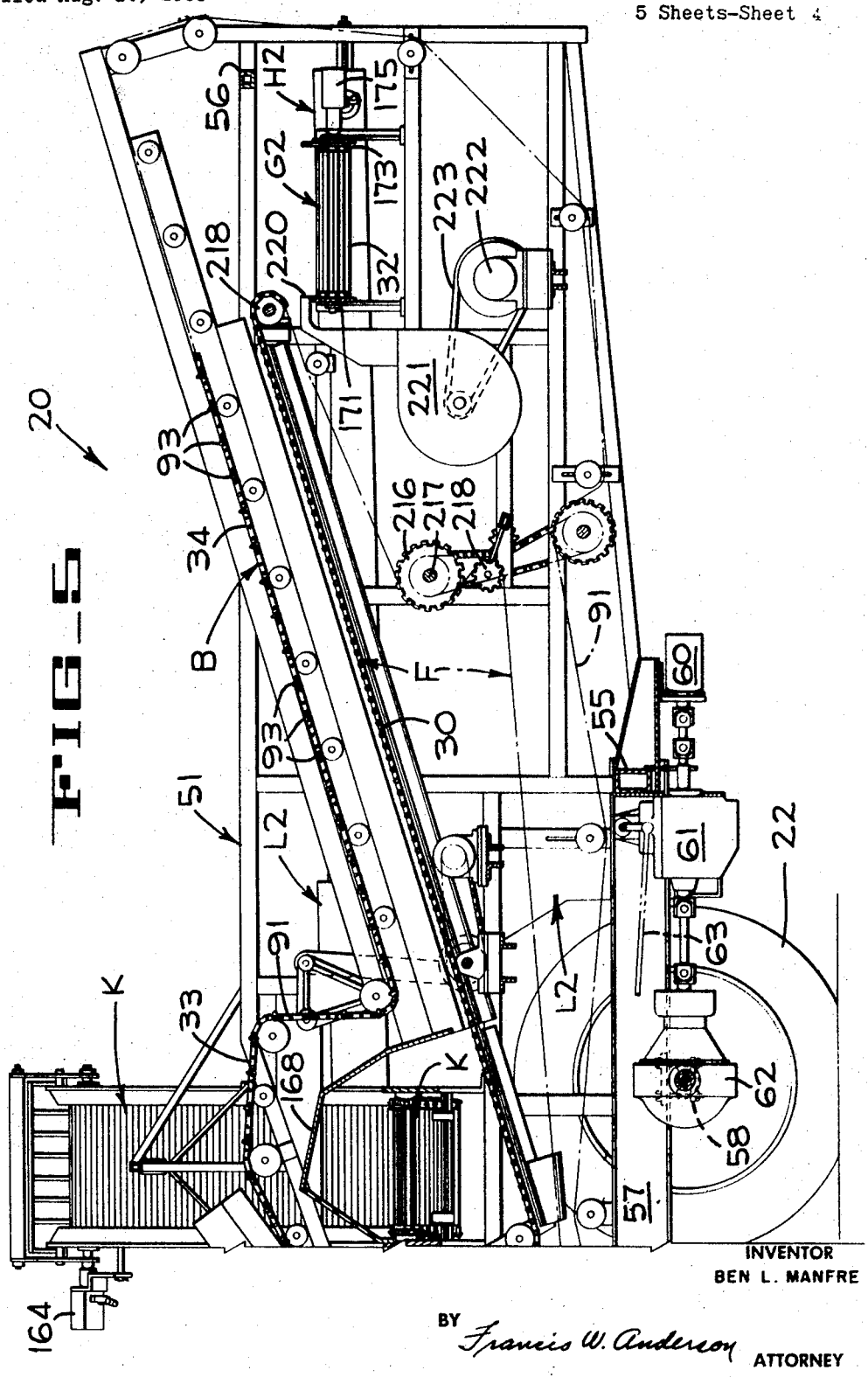

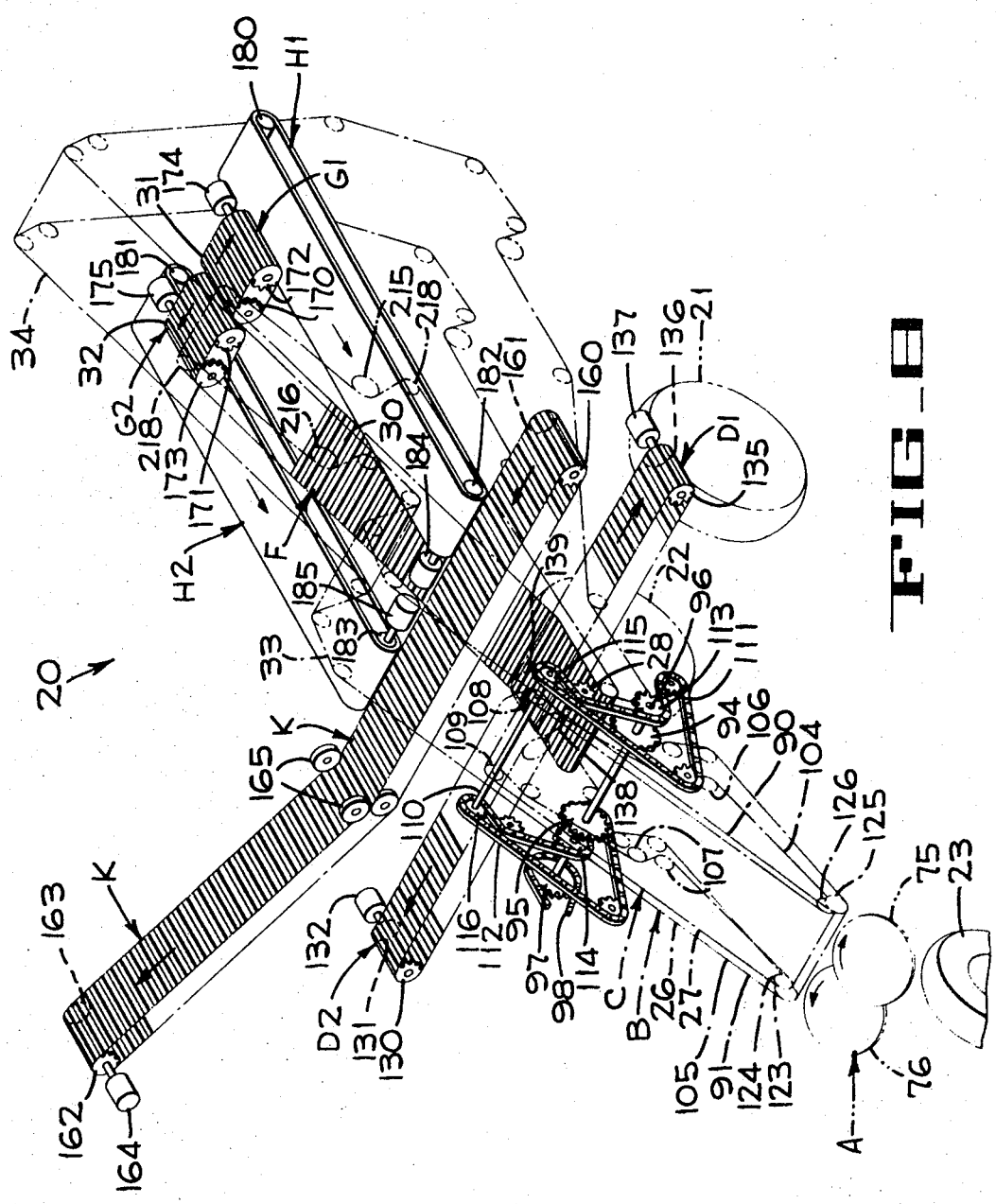

United States Patent Office 3,469,383
Patented Sept. 30, 1969

3,469,383
VINE CROP HARVESTING MACHINE
Ben L. Manfre, San Jose, Calif., assignor to FMC Corporation, San Jose, Calif., a corporation of Delaware
Filed Aug. 16, 1966, Ser. No. 572,827
Int. Cl. A01d *45/00;* A01g *19/00*
U.S. Cl. 56—327                                    15 Claims

ABSTRACT OF THE DISCLOSURE

A tomato harvester has laterally adjustable sorting conveyors for accommodating the fall of loose fruit and clods directly from the elevator conveyor to an undershaker conveyor. Also provided are side sort conveyors with chutes for returning material directly to the harvested bed.

---

The present invention pertains to the harvesting of vine-grown crops, such as tomatoes, and more particularly relates to a self-propelled harvesting machine for gathering and separating the vines and fruit and returning the green fruit onto the bed for later reharvesting.

More specifically, the harvesting machine of the present invention constitutes an improvement in the harvesting machine disclosed in the co-pending application of Csimma, Ser. No. 386,271, filed July 30, 1964, now Patent No. 3,340,935, issued Sept. 12, 1967, which application is assigned to the same assignee as the present invention. The present development concerns, among other features, improvements in the structural arrangement governing the flow path of the harvested tomatoes, vines and other material through the harvesting machine whereby the efficiency of the manual sorting operation is enhanced. Other features relate to mechanical and structural organizations which enable the user to convey green fruit back onto the bed from whence it was harvested and cover it with vines for protection while it is ripening for reharvesting at a later date.

An object of the present invention is to provide an improved vine crop harvesting machine.

Another object of the invention is to provide an improved organization of fruit and vine conveying means in a vine crop harvester.

Another object is to provide an improved article transfer apparatus, between a supply conveyor and an elevator conveyor, which evenly distributes the articles from the supply conveyor to sorting stations spaced along the transfer apparatus.

Another object of the invention is to provide a self-propelled harvesting machine with a means for varying the flow of harvested articles to a plurality of sorting locations.

A further object is to provide a self-propelled vine crop harvester which returns harvested green fruit to the bed and covers the fruit with vines for protection until it ripens.

Another object is to provide a harvesting machine wherein once-sorted fruit does not mingle with unsorted fruit.

Other objects and advantages of the present invention will become apparent from the following description and from the accompanying drawings, wherein:

FIGURE 1 is a diagrammatic view is perspective of the harvesting machine of the present invention viewed from its front end;

FIGURE 2 is a diagrammatic plan view of the overall harvesting machine illustrating the flow path of the harvested fruit and the arrangement of platforms which support personnel who sort the harvested fruit, and particularly showing the divided in-line sorting conveyors;

FIGURE 3 is a diagrammatic longitudinal section particularly illustrating the conveyor system of the harvester;

FIGURE 4 is an enlarged diagrammatic longitudinal section taken along line 4—4 on FIGURE 2;

FIGURE 5 is an enlarged diagrammatic longitudinal section taken along line 5—5 on FIGURE 2, and is drawn at the same scale as FIGURE 4;

FIGURE 6 is a diagrammatic longitudinal section taken along line 6—6 on FIGURE 2, illustrating on a slightly reduced scale a chute for returning green fruit to the harvested bed;

FIGURE 7 is a diagrammatic view in section taken along the line 7—7 on FIGURE 6, illustrating the chute as seen from the rear; and FIGURE 8 is a schematic perspective of the drive train for the various fruit and vine conveyors of the harvesting machine.

The general arrangement and method of operation of the harvesting machine 20 (FIGS. 1–3) includes drive wheels 21, 22, a steerable front wheel 23, and an operator's station 24 from which the driver maneouvers the machine along the rows of vines to be harvested. The machine is self-powered by an engine 25.

A vine digging, severing and gathering mechanism (FIGS. 2 and 3) is mounted at the front end of the machine and transfers the severed vines and any fallen fruit onto an upwardly inclined elevating flight 26 of a cross-slat type shaker conveyor B. The upper flight 27 (FIG. 3) of another cross-slat type drop-off conveyor C underlies part of the shaker conveyor elevating flight 26 whereby the loose fruit, dirt and vine piece which are too small to be supported by the shaker conveyor drop through it onto, and become supported by, the upper flight 27 and are discharged onto either of two laterally extending, oppositely moving sorting conveyors D1, D2 or onto the front flight 28 of an in-line undershaker conveyor F that is disposed below a space between the inner ends of conveyors D1 and D2 or, under certain conditions partially onto both the conveyors D1, D2 and the conveyor F.

The good fruit that is deposited on the conveyors D1, D2 is manually sorted from them and placed upon a lateral discharge conveyor K by personnel stationed alongside each of conveyors D1, D2 upon respectively associated platforms E1, E2. Any fruit or debris which is not sorted from the conveyors D1, D2 is discharged onto the ground through chutes, such as 29 in FIGURE 1, which can be directed to conduct the material either onto the furrow between the beds or onto the harvested bed itself.

The loose fruit, dirt and vine pieces, that drop between the inner ends of conveyors D1 and D2 and are deposited onto the front flight 28 of the undershaker conveyor F, are carried upwardly and rearwardly by its upper flight 30 and then deposited onto upper flights 31, 32 (FIG. 2) of two oppositely-directed laterally-extending rear cross conveyors G1, G2 that are positioned with their inner ends near the longitudinal centerline of the machine, thereby dividing the fruit delivered by the undershaker conveyor F.

Vines, fruit and clods, which do not drop through the shaker conveyor B (FIGS. 4 and 5), are conveyed rearwardly by the elevating flight 26 of that conveyor, over a descending flight 33, and onto another upwardly inclined shaker flight 34 of the shaker conveyor B. The rearwardly moving shaker flight 34 is reciprocated along its direction of travel to shake the vines and thus detach the fruit. The fruit, that is freed from the vines by the shaker flight 34, drops onto the upper flight 30, of the undershaker conveyor F where it joins any loose fruit, dirt and vine pieces previously deposited on the front flight 28 of conveyor F by the upper flight 27 of the drop-off conveyor C on the upward and rearward movement of this material onto the upper flights 31, 32 of the cross conveyors G1, G2.

Each rear cross conveyor G1, G2 discharges onto the inner portions 35, 36 (FIG. 2), respectively, of the upper flights of in-line endless sorting conveyors H1, H2. The inner portions 35, 36 are separated from their respective outer portions 37, 38 by vertical guide fences 39, 40 positioned just above the upper flights of the conveyors H1, H2. During movement of the fruit on the conveyors H1, H2, personnel stationed beside each conveyor upon platforms J1, J2 remove the good fruit from the inner portions 35, 36 and place it upon the outer portions 37, 38 of the same conveyors. The good fruit is carried forward by the conveyors H1, H2 and deposited onto the lateral discharge conveyor K which transports it to a chute 41 that directs the fruit into a collection bin, not shown, which is carried upon an orchard truck moving along beside the harvester. The material left on the inner portions 35, 36 of the conveyors H1, H2 is carried forward until it comes to the forward walls 43, 44 of the guide fences 39, 40 which deflect it in the direction of the arrows off the conveyors H1, H2 into chutes L1, L2 (FIGS. 1, 2, 5, 6 and 7) that conduct it back onto the harvested bed between the harvester wheels 21, 22.

At this point it should be noted that all fruit which is discharged from the conveyor K has traveled in front of, and has been inspected and sorted out by, personnel so that only fruit which is desired for further processing at that time is taken from the field.

The material on the shaker flight 33 of the shaker conveyor B that does not drop through onto the upper flight 30 of the undershaker conveyor F is carried rearwardly and deposited on top of the hardvested bed straddled by the drive wheels 21, 22. As a rule practically all the harvested fruit, both ripe and green, have been separated from this material so that it mainly comprises vines. Since the harvested green fruit has already been replaced upon the bed by chutes L1, L2, and possibly also by chutes 29, this material coming off the rear end of the shaker conveyor B lightly covers the green fruit and protects it while it ripens sufficiently for later reharvesting.

MAIN SUPPORT STRUCTURE

Goint now into further detail, the frame of the harvesting machine 20 (FIGS. 1–4) is fabricated of welded tubing and includes a pair of spaced longitudinal side sections 50, 51, which are laterally interconnected both for rigidity and for mounting various elements on the machine. Thus, the front end portions of the side sections 50, 51 (FIG. 4) are interconnected by structural tubes 52, 53, 54, and the central and rear portions of the frame sections are interconnected by structural tubes 55, 56 (FIG. 5). The tubes 54, 55 are connected to a pair of spaced longitudinal side frame members 57 (one only being shown). Each frame member 57 supports an end of the housing 58 of a differential 59. The wheels 21 and 22 are driven by drive shafts journalled in the housing 58 and operatively connected through the differential to a transmission 61 which, in turn, is driven by an hydraulic motor 60. A transmission control linkage 63 connects the transmission 61 with the operator's station 24 in a conventional manner, and hydraulic motor 60 is powered by an hydraulic pump 64 that is coupled to the engine 25. The pump 64 is in a conventional hydraulic circuit, not illustrated, including a hydraulic fluid reservoir R (FIGS. 1, 2 and 4) that is mounted on the frame section 51. The various control valves for the hydraulic circuit are mounted adjacent the driver's steering wheel 68.

As is more fully described in detail in the aforementioned Csimma application Ser. No. 386,271, the front wheel 23 (FIGS. 1 and 2) is aligned with the drive wheel 21 and is mounted in a steering yoke 65 that is pivotally connected for steering movement to the free end of a box beam 66. The other end of the beam 66 is mounted upon a horizontal pivot shaft (not shown) that is supported by the frame section 50 to enable the wheel 23 to move up and down with changes in terrain. A driver's platform 67, which forms the floor of the operator's station 24, contains a mounting for a double-acting hydraulic ram (not shown), also connected into the harvester's hydraulic system, which pivots the beam 66 about its axis when its piston rod is extended or retracted, thus changing the relative positions of the beam 66 and the frame sections 50, 51. The front end of the harvesting machine 20 is thereby vertically adjustable so that the position of the digging mechanism A relative to the ground is maintained at a selected elevation, either for optimum digging action, or for ground clearance during movement of the harvester to and from the fields.

Another hydraulic ram (not shown) is connected between the beam 66 and the steering yoke 65 and is controlled by a valve (not shown) which is in turn actuated by the steering wheel 68 at the operator's station 24. In addition to the power steering action of the ram, the driven wheels 21 and 22 (FIG. 2) can be individually braked by means of associated brake pedals 70, 71 and the harvester can thereby by maneuvered in close quarters by driving one of the drive wheels faster than the other.

DIGGING MECHANISM

The vine digging and gathering mechanism A (FIGS. 1–3) also is unchanged in its general construction, operation and arrangement from the digging and gathering mechanism disclosed in the aforementioned Csimma application Ser. No. 386,271. Thus, the mechanism A includes counter-rotating steel digging discs 75, 76 that are positioned ahead of the shaker conveyor elevating flight 26, and cooperating corrugated pickup belts 77, 78 which are respectively associated with the discs; the inner flights of the pickup belts move rearwardly to deposit the vines, plus any loose fruit, on the elevating flight 26 of the shaker conveyor B. Upright shafts 79, 80, respectively, support the discs 75, 76 and are driven through a pair of endless drive chains 81, 82 and sprockets 83, 84 mounted on main drive shaft 85 that is connected to the engine 25 through main drive chain 86 (FIG. 1).

SHAKER AND DROP-OFF CONVEYORS

The shaker conveyor B (FIGS. 4, 5 and 8) comprises laterally spaced endless roller chains 90, 91 which are each provided with spaced attachment links 92 (FIG. 4) carrying hollow cross bars 93. The cross bars are approximately tear-drop or wedge-shaped in cross section so that the leading surface of each bar presents a broad edge that inhibits the tendency of vines and tomatoes to roll back down the relatively steep initial elevating flight 26 of the shaker conveyor.

Forward of the front flight 28 of the under-shaker conveyor F (FIGS. 4 and 8), the endless chains 90, 91 carrying the lower, forwardly moving flight of the shaker conveyor B are trained over drive sprockets 94, 95 mounted on shaft 96 which is powered through sprockets 97, chain 98, and sprocket 99 by the main drive shaft 85. The shaker flight 34 (FIG. 5) of the shaker conveyor B is reciprocated back and forth to jar the fruit from the vines as it travels toward the rear of the machine. This reciprocation can be provided by a mechanism such as that disclosed in the aforementioned Csimma application Ser. No. 386,271.

The drop-off conveyor C (FIGS. 3, 4 and 8) is provided with tubular cross bars 103 which are spaced closer than the pitch distance of the shaker conveyor cross bars 93 so as to support the fruit which is too small to be supported by the shaker conveyor. The ends of each bar 103 are riveted to endless roller chains 104, 105 which are supported by, and trained around, freely rotatable rollers 106, 107, and drive sprockets 108, 109, respectively. The drive sprockets 108, 109 are mounted on a shaft 110, and receive their power from shaft 96 through drive chains 111, 112 trained around sprockets 113, 114 on shaft 96 and 115, 116 on shaft 110. The conveyor C is driven at the same speed as the shaker conveyor B.

In order to inhibit foreign matter handled by the shaker conveyor elevating flight 26 from contacting the chains 90, 91, 104, 105, a flexible guard flap 120 (FIG. 4) is secured to a member 121 that is fixed to the frame section 51. The flap has a lower end portion which lies inward of the chain 91. A similar guard flap 122 (FIG. 1), shown broken away, is provided for the opposite chain 90. To further reduce wear, the chains 91, 105 (FIG. 4) are trained around rotatable idler discs 123, 124, respectively, near the vine digging mechanism A so as to eliminate sprocket teeth which would tend to jam dirt and debris into the space between adjacent rollers of the chains. In like manner, chains 90, 104 are trained around rotatable idler discs 125, 126 (FIG. 8) for the same purpose.

FRONT SORTING AND DISCHARGE CONVEYORS

The front sorting conveyor D2 (FIGS. 2, 4 and 8) is trained around drive sprockets 130, 131, which are driven by an hydraulic motor 132 and idler sprockets 133, 134, and projects laterally through the frame section 51. Similarly, the front sorting conveyor D1 (FIGS. 2 and 8), which is aligned with conveyor D2, projects outward through the frame section 50 and is trained around drive sprockets 135, 136, which are powdered by an hydraulic motor 137, and idler sprockets 138, 139. Both motors 132, 137 are connected by hydraulic lines to the hydraulic pump 64 at the station 24, and are controlled by the driver at that location.

One of the important features of this invention is that both conveyors D1, D2 are adjustable laterally with respect to the centerline of the shaker conveyor B so that the quantity of fruit deposited on these conveyors D1, D2, and also on the undershaker conveyor F, can be controlled to suit various sorting conditions. The mounting for conveyor D2 (FIGS. 1 and 4) includes lateral angle supports 142, 143 rigidly affixed to conveyor side plates 144, 145, respectively, that rest on harvester frame members 146, 147, and bolts 148, 149 spaced along the supports 142, 143 connecting them with the frame member 146, 147, respectively. Thus, when the bolts 148, 149 are removed the conveyor D2 can be adjusted between its outermost or "open" position as shown in FIGURE 2, where its inner end 151 is beneath the edge 26b of shaker conveyor elevating flight 26, and its innermost or "closed" position indicated by the phantom line 152, where its inner end 151 is beneath the centerline of the flight 26. Sorting conveyor D1 is mounted in the corresponding manner, and likewise can be adjusted between its outermost or "open" position, represented by 150 on FIGURE 2, to its innermost or "closed" position 153. Through this arrangement the unsorted fruit coming off the drop-off conveyor C can be handled in three different ways; it all can be directed onto the front sorting conveyors D1, D2 by placing them in their innermost closed positions 152, 153, it all can be directed onto the undershaker conveyor F and utimately onto sorting belts H1 and H2 by placing the conveyors D1, D2 in their outermost open positions 150, 151, or it can be sent in varying amounts to both conveyors D1, D2 and the undershaker conveyor F by placing the conveyors D1, D2 at various positions between closed and open.

The need for, and the value of, laterally adjustable front sorting conveyors is especially apparent when harvesting fruit, such as tomatoes, in areas of silty or loose soil. This type of soil quite readily falls through the shaker conveyor's elevating flight 26 and the drop-off conveyor C so that not much, if any, clods or other dirt particles are carried up to the in-line sorting conveyors H1, H2, thus permitting most of the fruit to pass through the elevating flight 26 onto the drop-off conveyor C. Since sorting from the conveyors D1, D2 is handled by six personnel, whereas twelve can be assigned to sort from the in-line conveyors H1, H2, harvesting in this type of soil with the lateral conveyors D1, D2 closed directs most of the fruit in front of only one third of the sorting crew, overworking them and underworking the others. This situation also arises when there is an abundance of loose fruit, such as when a bed is reharvested. In both cases, the problem is easily overcome by adjusting the positions of the lateral sorting conveyors D1, D2 until the fruit is evenly distributed to all sorting personnel.

Another advantage provided by the combination of adjustable lateral sorting conveyors D1, D2 and the extended position of the unshaker conveyor F is in the ability to operate the harvester without personnel at these lateral conveyors. If the conveyors D1, D2 are extended to their fully open position, all the fruit will be deposited onto the undershaker conveyor F and pass onto the in-line sorting conveyors H1, H2. Thus if a shortage of personnel occurs, or if for some other reason it is preferable to do all the sorting from the conveyors H1, H2, a minor adjustment of the harvester, quickly made, will solve the problem.

The discharge conveyor K (FIGS. 1, 5 and 8) is trained at its inner end around a pair of idler sprockets 160, 161 at the left side of the harvester, and at its outer end around a pair of drive sprockets 162, 163 powered by an hydraulic motor 164 connected to the aforementioned hydraulic pump, and idler rollers 165, all supported through associated struts and bracing by the harvester frame. The inclined portion of the conveyor K, i.e., that part outside of the idler rollers 165, can be raised or lowered by hydraulic means 166 (FIG. 1) to compensate for receiving bins of different heights.

In order to prevent material from dropping onto the discharge conveyor K from the shaker conveyor B, a sheet metal guard 168 (FIG. 5) extends over the discharge conveyor K and has sloping walls which will direct any such material onto the sorting conveyors D1, D2, or onto the undershaker conveyor F.

Further features contributing to the portability of the harvesting machine 20 (FIGS. 1 and 2) are that the outboard end portions of the worker's support platforms E1, E2 are removable and that the outer ends of the front sorting conveyors D1, D2 can be folded down. Both of these features are accomplished by the use of ordinary mechanical expedients and hence are not specifically illustrated or described in detail.

REAR CROSS CONVEYORS

The rear cross conveyors G1, G2 (FIGS. 2, 5 and 8), are preferably of slat-type construction and are trained respectively around sets of idler sprockets 170, 171, and sets of drive sprockets 172, 173 which are driven through driveshafts by hydraulic motors 174, 175 that are connected by hydraulic lines to the hydraulic pump at station 24. Note that rear cross conveyors are driven in opposite directions so that their upper flights move outward from the centerline of the harvester to deposit fruit upon the in-line sorting conveyors H1 and H2.

IN-LINE SORTING CONVEYORS

The in-line sorting conveyors H1, H2 (FIGS. 2 and 8), preferably formed of flexible, resilient-surface belting, are respectively trained around idler pulleys 180, 181 and drive pulleys 182, 183. The drive pulleys 182, 183 are mounted on driveshafts connected to hydraulic motors 184, 185, respectively, that are in turn connected to the hydraulic pump mentioned above.

Another important feature of this invention is that the in-line sorting conveyors H1, H2 are divided respectively into inner portions 35, 36 and outer portions 37, 38 by guide fences 39, 40 to facilitate efficient sorting out of the good fruit. These fences 39, 40 are supported with their bottom edges just above the belts H1, H2 by adjustable brackets 190, 191, such as by sleeve and set screws (not shown), that are cantilevered out from rigid mountings on the inner guide rails 192, 193 of the conveyors H1, H2, respectively, and hence can be moved laterally with respect to the centerline of these conveyors. This fence arrangement makes it possible to sort out the good fruit from the total material deposited by the cross conveyors 61, 62 onto the inner portions 35, 36 of the conveyors H1, H2 which in many cases, such as in reharvesting or where there is a lot of clod material, results in a reduction in material handling over the reverse procedure of sorting off the undesired material and leaving the good fruit.

IN-LINE SORTING CONVEYOR DISCHARGE CHUTES

The sorted out good fruit placed on the outer portions 37, 38 of the conveyors H1, H2 is deposited on the discharge conveyor K which carries it to the collection bin. The unwanted material on the inner portions 35, 36 is deflected off the conveyors by forward walls 43, 44 of fences 39, 40 into in-line sorting conveyor discharge chutes L1, L2 (FIGS. 2, 5, 6 and 7) that conduct it back onto the harvested bed between the wheels 21, 22. These chutes are mounted at the inner edges of the conveyors H1, H2 such that their rear walls 200, 201 and a portion of their side walls 202, 203 extend above the upper flights 210, 211 of the conveyor belts, and upper edges of the front walls 204, 205 lie just beneath the lower flights of the conveyor belts, as shown by 212 in FIGURES 6 and 7, and meet with the lower portions of the top edges of the side walls, as shown in FIGURE 7 by 202a, thus providing for catching all of the material diverted off the inner portions of the conveyors H1, H2 by the guide fence forward walls 43, 44.

The importance of the chutes L1, L2 is evident when the harvested material contains a significant amount of green, i.e., unripe, fruit. Without the chutes this fruit would be distributed at random upon the ground under the harvester, some on the bed and most in the furrows on either side of the bed. That in the furrows would be lost as far as further harvesting is concerned, whereas that on the bed can be harvested again, such as after it ripens; the chutes L1, L2 direct all the green fruit onto the bed, thus eliminating this waste.

UNDERSHAKER CONVEYOR

As shown in FIGURES 3, 4, 5 and 8, the undershaker conveyor F extends under the major portion of the length of the shaker conveyor flight 34 and is trained around drive sprockets 215, 216 that are secured to the shaft 217, and idler sprockets 218. It will be noted that the upper, discharge end of the undershaker conveyor F is spaced above the plane of the conveying flights of the rear cross conveyors G1 and G2. The discharge throat 220 (FIG. 5) of a blower 221 is positioned between the upper end of the undershaker conveyor F and the confronting end portions of the rear cross conveyors G1 and G2. The throat 220 is as wide as the undershaker conveyor F so that any material lighter than the fruit delivered by the undershaker conveyor is blown off the cross conveyors, A hydraulic motor 222 and a belt and pulley drive 223 power the blower 221, and the motor is connected to the harvester's hydraulic system and the hydraulic pump 64 in the conventional manner.

OPERATION

The harvesting machine 20 is positioned so that the row of vines, for example tomato vines, to be harvested coincides with the longitudinal centerline of the shaker conveyor B, and a truck, not shown, is moved alongside with its fruit collection bin under the discharge chute 41. Preferably, three sorting personnel are stationed upon each front sorting conveyor platform E1, E2, and six sorting personnel are stationed upon each side sorting conveyor platform J1, J2. The vine digging discs 75, 76 are adjusted by the driver to the desired elevation and then, along with the conveyors, are put in motion. Both vehicles are then driven forward at the same speed. The digging discs sever the vines slightly below the surface of the ground and, in conjunction with the pick-up belts 77, 78, transfer the vines rearwardly onto the shaker conveyor elevating flight 26 (FIG. 4) together with a thin layer of dirt, clods, and any loose tomatoes that may have been lying on the ground.

The loose tomatoes, clods and other material which are smaller than the spaces between the shaker conveyor bars 93, but larger than the spaces between the bars, are supported by the drop-off conveyor bars 103 until such conveyed material overlies the lateral extending front sorting conveyors D1, D2 (FIG. 2) and the front flight 28 of the undershaker conveyor F (FIG. 4). This material then drops onto either the front sorting conveyors D1, D2, the front flight 28 of the undershaker conveyor F, or partially onto both depending upon the position, between "open" or "closed," of the front sorting conveyors. The material on the front sorting conveyors is moved laterally outward past the sorting personnel, stationed upon the platforms E1, E2 who remove only the good fruit and place it upon the discharge conveyor K. The rejected material remaining upon the front sorting conveyors is discharged from these conveyors onto the ground. The material on the undershaker conveyor is carried rearwardly where it is joined by additional material dropping through the shaker flight B of the shaker conveyor, and sorted with this additional material as later described.

As the vines and attached fruit are conveyed by the shaker conveyor B over the sorting conveyors D1, D2, and over the discharge conveyor K, some tomatoes may become detached and fall. The guard 168 (FIG. 5) intercepts these tomatoes and causes them to roll either onto the front sorting conveyors D1, D2 or onto the undershaker conveyor F. In either case the fruit cannot be discharged from the harvesting machine without first being inspected by the sorters stationed on the platforms E1, E2, or by the sorters stationed on the platforms J1, J2. After the vines on the shaker conveyor B pass the descending flight 33 between the elevating flight 26 and the shaker flight 34, they are subjected to a vigorous shaking by fore and aft reciprocation of the shaker flight while they continue their rearward movement. The shaking causes the tomatoes to become detached, and thus unsupported, whereby the tomatoes drop through the spaces between the shaker bars 93 onto the under-shaker conveyor F and are conveyed upwardly and rearwardly toward the rear cross conveyors G1, G2. Some leaves, vine pieces and so forth also drop from the shaker conveyor B onto the under-shaker conveyor F; as soon as the fruit and this foreign material drops from the upper end of the undershaker conveyor F, the air blast emanating from the blower 221 blows away material which is lighter than the smallest fruit being retained. The rear cross conveyors G1, G2 thus primarily retain only fruit to be sorted, and respectively discharge the fruit onto the inner portions 35, 36 of in-line sorting conveyors H1, H2 for conveyance back toward the discharge conveyor K past the sorters stationed upon the support platforms J1 and J2.

The twelve sorting personnel for the in-line sorting conveyors H1, H2 remove the good fruit from the inner portions 35, 36 of the in-line sorting conveyors H1, H2, and deposit it on the outer portions 37, 38 of the same conveyors. All other fruit and debris, if any, is carried forward to walls 43, 44 of fences 39, 40 where it is diverted off the conveyors and into chutes L1, L2 that conduct it back onto the harvested bed. Thus, the fruit which is discharged from the sorting conveyors H1, H2 onto the discharge conveyor K has traveled in front of, and has been inspected by, at least six sorters. The fruit on the conveyor K is discharged into the chute 41 which is positioned over, or within, a collection bin on the trunk which is travelling beside the harvester.

The harvesting machine of the present invention is an improvement over the machine disclosed in the aforementioned co-pending Csimma application Ser. No. 386,271 in several ways. First, by virtue of the adjustable, laterally-extending front sorting conveyors D1, D2 and the new position of the forward end of the undershaker conveyor F, the flow of fruit and other material to the various sorting stations can be easily controlled to balance the work load at all locations, thus providing for a higher level of efficiency in the sorting operation. Second, the adjustable guide fences 39, 40 dividing the in-line sorting conveyors into inner and outer portions reduces the work involved at the associated sorting locations, since only the good fruit is handled instead of the unwanted material which often can be greater in volume. A third advantage of the present harvester is the feature of depositing the green fruit back on the harvested bed via the chutes L1, L2 so that this fruit can be harvested again after it has ripened. Still another advantage provided by the present harvesting machine is that the green fruit deposited on the harvested bed is covered with the vines coming off the back of the machine. This protects the fruit while it is ripening, a desirable result that can be especially advantageous when usually sturdy fruit, such as pear-shaped tomatoes which ripen well under such conditions, are involved.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A vine crop harvesting machine comprising means for gathering vines and fruit along with entrained dirt and fallen fruit, a first conveyor arranged to receive and convey the fruit, dirt and vines along a predetermined path, a front sorting conveyor arranged to receive loose dirt and fruit from said first conveyor and to convey the fruit and dirt along a path transversely related to said predetermined path, a work platform adjacent said front sorting conveyor, a second conveyor located downstream of said front sorting conveyor and arranged to receive the loose fruit from said first conveyor and convey the fruit in a direction toward the discharge end of said first conveyor, a discharge conveyor arranged to receive and convey sorted fruit along a path beside the conveying flight of said front sorting conveyor, a side sorting conveyor mounted at one side of said first conveyor for conveying the fruit in a direction counter to the direction of movement of the conveying flight of said first conveyor, and means for transferring fruit from said second conveyor onto said side sorting conveyor, the downstream end of the conveying flight of said side sorting conveyor being arranged to discharge the sorted fruit onto said discharge conveyor, said front sorting conveyor being adjustably mounted onto the machine so that the position of said front sorting conveyor with respect to said second conveyor can be varied to regulate the flow of fruit and loose dirt between said front sorting conveyor and said side sorting conveyor.

2. A vine crop harvesting machine according to claim 1 wherein said front sorting conveyor comprises a pair of oppositely directed sorting conveyors adjustably mounted end to end with their receiving ends positioned near the center line of the said first conveyor and arranged to convey material away from said center line, each of said oppositely directed sorting conveyors being movable toward or away from said center line to regulate the quantity of loose dirt and fruit deposited on said sorting conveyors.

3. A vine crop harvesting machine according to claim 2 wherein the forward end of said second conveyor is positioned beneath said oppositely directed sorting conveyors to receive loose dirt and fruit from said first conveyor when said oppositely directed sorting conveyors are positioned away from said center line so that loose dirt and fruit can pass between said receiving ends of said sorting conveyors.

4. A machine for harvesting vine crops in a row comprising a mobile frame, means mounted on said frame for gathering vines and fruit from the ground, first conveying means for moving vines and fruit from said gathering means in one direction along a predetermined path, second conveying means arranged to receive loose fruit from said first conveying means and to convey such fruit in said one direction, a sorting conveyor mounted along one side of said second conveying means for conveying the fruit in a direction opposite to said one direction, means for transferring fruit from said second conveying means onto said sorting conveyor, a worker support platform adjacent to said sorting conveyor, fruit restricting means adjacent to said sorting conveyor for restricting the fruit and other material deposited on said conveyor to an inner longitudinal portion thereof and for providing an outer longitudinal portion for conveying fruit sorted out from said inner longitudinal portion to additional fruit-handling means, and fruit deflecting means associated with said fruit restricting means for deflecting undesired fruit and other material off said sorting conveyor.

5. A machine according to claim 4 wherein said fruit restricting means is adjustably mounted on said mobile frame for varying its position relative to said sorting conveyor and thus vary the size of said first and second longitudinal portions of said sorting conveyor.

6. A machine according to claim 5 wherein the said fruit restricting means comprises an upright rigid fence-like member extending substantially the length of said sorting conveyor and angling off at its downstream end to the edge of said sorting conveyor nearest said second conveying means.

7. The machine of claim 4 with a second sorting conveyor, mounted along the other side of said second conveying means, for conveying loose fruit in the same direction as that of said sorting conveyor, and a second said fruit restricting means mounted on said mobile frame adjacent said second sorting conveyor.

8. The machine of claim 7 wherein both fruit restricting means are adjustably mounted on said mobile frame for varying their position relative to said sorting conveyors and thus vary the size of said first and second longitudinal portions of said conveyors.

9. A vine crop harvesting machine comprising means for gathering growing vines and fruit along with entrained dirt and fallen fruit, a shaker conveyor arranged to receive and convey the fruit, dirt and vines along a predetermined longitudinal path, said shaker conveyor including a reciprocating shaker flight for agitating the vines to loosen the fruit attached thereto, first and second sorting conveyors adjustably mounted on said machine for movement towards or away from said predetermined path and arranged to receive loose dirt and fruit from said shaker conveyor at a location upstream of said shaker flight and to convey the fruit along opposed lateral paths relative to said longitudinal path, a worker's platform mounted adjacent each of said first and second sorting conveyors, an undershaker conveyor arranged to receive loose dirt and fruit from said shaker conveyor at a location upstream of said shaker flight as well as the loose fruit from said shaker flight and convey the fruit toward the discharge end of said flight, a discharge conveyor mounted beneath the conveying flight of said shaker conveyor and located intermediate said shaker flight and said first and second sorting conveyors, said discharge conveyor being arranged to receive and convey loose sorted fruit laterally in the direction of movement of the conveying flight of one of said sorting conveyors, third and forth sorting conveyors located one at each side of said shaker conveyor for conveying the fruit in a direction counter to the direction of movement of the conveying flight of said shaker conveyor, means adjustably mounted over said third and fourth sorting conveyors for dividing their conveying flights into inner and outer longitudinal portions, means associated with said dividing means for conducting unsorted fruit and other material from the downstream ends of said inner longitudinal portions of said third and fourth sorting conveyors onto a harvested bed, means for transferring substantially half the fruit from said undershaker conveyor onto the inner portions of said third and fourth sorting conveyors, and a worker's platform adjacent each of said third and fourth sorting conveyors, the downstream ends of said outer portions of said conveying flights of said third and fourth sorting conveyors being arranged to discharge the sorted fruit onto said discharge conveyor.

10. The machine of claim 9 wherein said dividing means for said third and fourth sorting conveyors comprises a pair of upstanding guide fences, one fence over each said conveyor, said fences extending substantially the length of said conveyors and including main body portions and downstream ends, said downstream ends angularly directed from said main body portions to the edges of the associated conveyors nearest said shaker conveyor to deflect unsorted fruit and other material off said conveyor.

11. The machine of claim 10 wherein said unsorted fruit conducting means comprises a pair of duct-like chutes, one chute associated with each of said dividing means, said chutes having open upper and lower ends with said open upper ends positioned with respect to said dividing means such that all said unsorted fruit and other material deflected off said conveyors is caught by said chutes, and with said open lower ends positioned proximate to a harvested bed when the machine is harvesting fruit from said bed.

12. The machine of claim 9 wherein the said shaker conveyor and said unsorted fruit conducting means are associated such that said unsorted fruit is conducted onto said harvested bed and subsequently said shaker conveyor deposits vines on top of said unsorted fruit on said bed.

13. A machine for harvesting vine crops in a row comprising a mobile frame, means mounted on said frame for gathering vines and fruit from the ground, means for conveying said vines and fruit along a predetermined path and sorting the vines from the fruit, means for conveying the fruit past fruit-sorting stations where the desired fruit is sorted out from the rest of the fruit, means for discharging the sorted out fruit from the machine, means for discharging the vines from the machine, and means for returning the rest of the fruit to the harvested bed comprising a chute system extending from the area of the sorting stations to a position proximate the harvested bed, said chute system comprising a pair of duct-like chutes having open upper and lower ends, said upper open ends being positioned proximate to the harvested bed.

14. The machine of claim 13, wherein the means for conveying the fruit past fruit sorting stations includes a pair of endless belt conveyors with associated guide fences adjustably mounted over the conveyors that divide the conveying flights into two longitudinal portions, one portion for receiving unsorted fruit and carrying fruit not sorted out to the duct-like chutes, the other portion for receiving sorted out fruit and conveying it to the means for discharging the sorted out fruit from the machine.

15. A vine crop harvesting machine of the type comprising means for gathering a mass including the vines and crop, elevator conveyor means for receiving the gathered crop and delivering it to a shaker having an undershaker conveyor, and sorting conveyors running oppositely from a mid-portion of the machine for receiving loose material and loose crop from said elevator conveyor means; the improvement wherein said undershaker conveyor extends forwardly beneath said sorting conveyors and said elevator conveyor means, and means are provided for adjusting the gap between the material receiving ends of said sorting conveyors to provide a predetermined flow of loose material directly from said elevator conveyor means to said undershaker conveyor.

References Cited
UNITED STATES PATENTS

| | | | |
|---|---|---|---|
| 3,078,926 | 2/1963 | Ries et al. | 171—14 |
| 3,252,520 | 5/1966 | Hill et al. | 171—94 |
| 3,301,331 | 1/1967 | Looker et al. | 171—14 XR |
| 3,340,935 | 9/1967 | Csimma | 171—14 |

ANTONIO F. GUIDA, Primary Examiner

U.S. Cl. X.R.

171—14